(No Model.)

L. H. YOUNG.
NUT LOCK.

No. 478,300. Patented July 5, 1892.

on line 3-3

Witnesses:
W. W. Mortimer
W. R. Kennedy

Inventor:
Levi H. Young
By his Atty
Phil. T. Dodge

UNITED STATES PATENT OFFICE.

LEVI H. YOUNG, OF ST. JOHN, CANADA.

NUT-LOCK.

SPECIFICATION forming part of Letters Patent No. 478,300, dated July 5, 1892.

Application filed December 2, 1890. Serial No. 373,342. (No model.) Patented in Canada July 12, 1890, No. 34,694.

*To all whom it may concern:*

Be it known that I, LEVI H. YOUNG, of St. John, in the Province of New Brunswick and Dominion of Canada, have invented certain Improvements in Nut-Locks, (patented in Canada on the 12th day of July, 1890, No. 34,694,) of which the following is a specification.

The aim of my invention is to provide means for locking a nut in any position in which it may be adjusted; and to this end it consists in the combination of two lock-nuts threaded to screw upon the bolt outside of the main nut and so formed and weighted at one edge that when seated one against the other they will tend to gravitate in reverse directions, and thus lock firmly in place.

Figure 1:
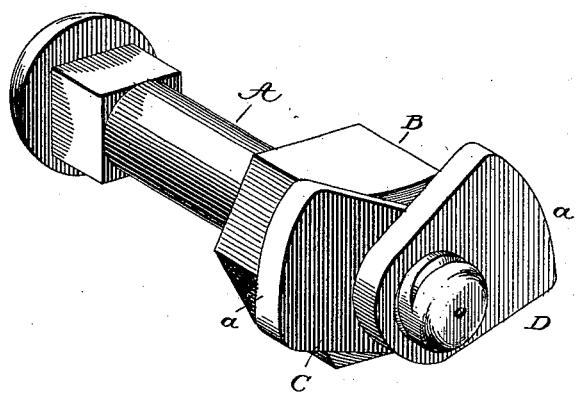
Figure 2:
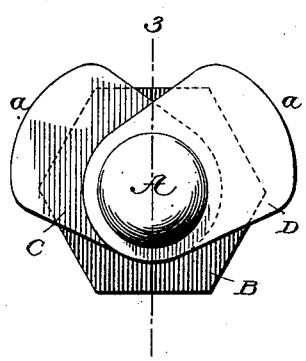
Figure 3:
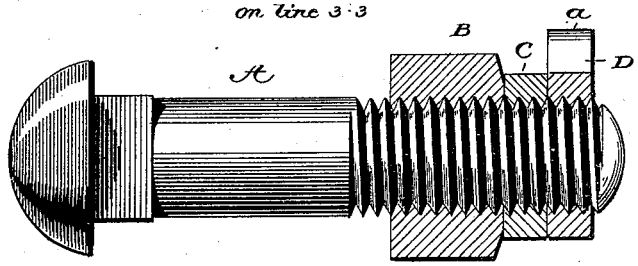
Figure 4:
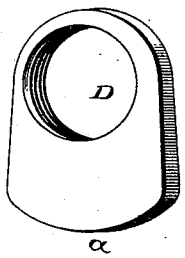

In the accompanying drawings, Figure 1 is a perspective view of a bolt and nut provided with my double lock. Fig. 2 is an end view of the same. Fig. 3 is a section on line 3 3 of Fig. 2. Fig. 4 is a perspective view of one of the locking devices.

Referring to the drawings, A represents a bolt, and B the main nut thereon, both of ordinary construction.

C and D represent the two locking-nuts, adapted to screw one behind the other on the bolt outside of the main nut and each having one edge extended or enlarged, as shown at a, so that it has a preponderance of weight and tends to fall to the under side of the bolt.

The lock-nuts are intended to be screwed one firmly against the other, and they are so formed—that is to say, their respective threads are brought to the surface at such points in relation to the center—that when they are screwed together their heavy edges will fall, respectively, on opposite sides of the center, either as shown in full lines in Figs. 1 and 2 or as shown in dotted lines in Fig. 2. As a consequence the inner nut C tends to turn outward, while its companion D tends to turn inward, and the result is that they are both locked firmly in place, so as to prevent the escape of the main nut and give support thereto.

The essence of my invention resides in the combination of two nuts, each heavy at one edge, adapted to turn toward each other under the influence of gravity, and it is to be understood that they may be varied in form at will provided these constructions are retained.

The advantage of using two nuts constructed with special reference to their being seated against each other and to their weighted edges falling in such relations that the nuts tend to turn toward each other lies in the fact that they are thus enabled to lock the main nut at any point at which it may stand on the bolt. For railway purposes this is a matter of particular importance, as it admits of the main nut being set up and securely held at the required position and of its being turned back and locked in a new position during the spring season, as is practiced in northern latitudes.

I do not claim, broadly, a nut weighted on one edge to prevent it from unscrewing; but What I do claim is—

1. A nut-lock consisting of two nuts, each weighted at one edge, so that when seated one against the other the weighted portions of the nuts are on opposite sides of the bolt, the bolt being in a horizontal position, whereby they tend to turn toward each other and are adapted to lock a main nut in any required position.

2. In combination with a bolt and a main nut thereon and two lock-nuts seated on the bolt, one against the other, their edges weighted on one side and such weighted edges being oppositely arranged to cause the nuts to turn toward each other.

In testimony whereof I hereunto set my hand, this 28th day of November, 1890, in the presence of two attesting witnesses.

LEVI H. YOUNG.

Witnesses:
W. R. KENNEDY,
FABIUS STANLY ELMORE.